(12) United States Patent
Arakawa

(10) Patent No.: US 10,564,534 B2
(45) Date of Patent: Feb. 18, 2020

(54) LIGHT SOURCE APPARATUS AND PROJECTOR

(71) Applicant: SEIKO EPSON CORPORATION, Tokyo (JP)

(72) Inventor: Osamu Arakawa, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/364,372

(22) Filed: Mar. 26, 2019

(65) Prior Publication Data

US 2019/0302600 A1    Oct. 3, 2019

(30) Foreign Application Priority Data

Mar. 27, 2018    (JP) .................. 2018-060878

(51) Int. Cl.
*G03B 21/20*    (2006.01)
*H04N 9/31*    (2006.01)
*G03B 33/12*    (2006.01)

(52) U.S. Cl.
CPC ....... *G03B 21/2066* (2013.01); *G03B 21/204* (2013.01); *H04N 9/3158* (2013.01); *G03B 21/2013* (2013.01); *G03B 33/12* (2013.01)

(58) Field of Classification Search
CPC .............. G03B 21/204; G03B 21/2066; G03B 21/2033; G03B 21/2013; H04N 9/3155; H04N 9/3158; H04N 9/3161
See application file for complete search history.

(56) References Cited

U.S. PATENT DOCUMENTS

2011/0284902 A1    11/2011    Daicho et al.
2018/0231881 A1*    8/2018    Akiyama .............. G03B 21/204

FOREIGN PATENT DOCUMENTS

JP    2015-015485 A    1/2015

* cited by examiner

*Primary Examiner* — Ryan D Howard
(74) *Attorney, Agent, or Firm* — Oliff PLC

(57) ABSTRACT

A light source apparatus according to an aspect of the present disclosure includes an excitation light source and a wavelength converter including a transparent phosphor and a base. The wavelength converter has a light incident area, a first area, and a second area, and the wavelength converter includes a second reflector (angle changer) provided in a portion corresponding to the second area.

14 Claims, 10 Drawing Sheets

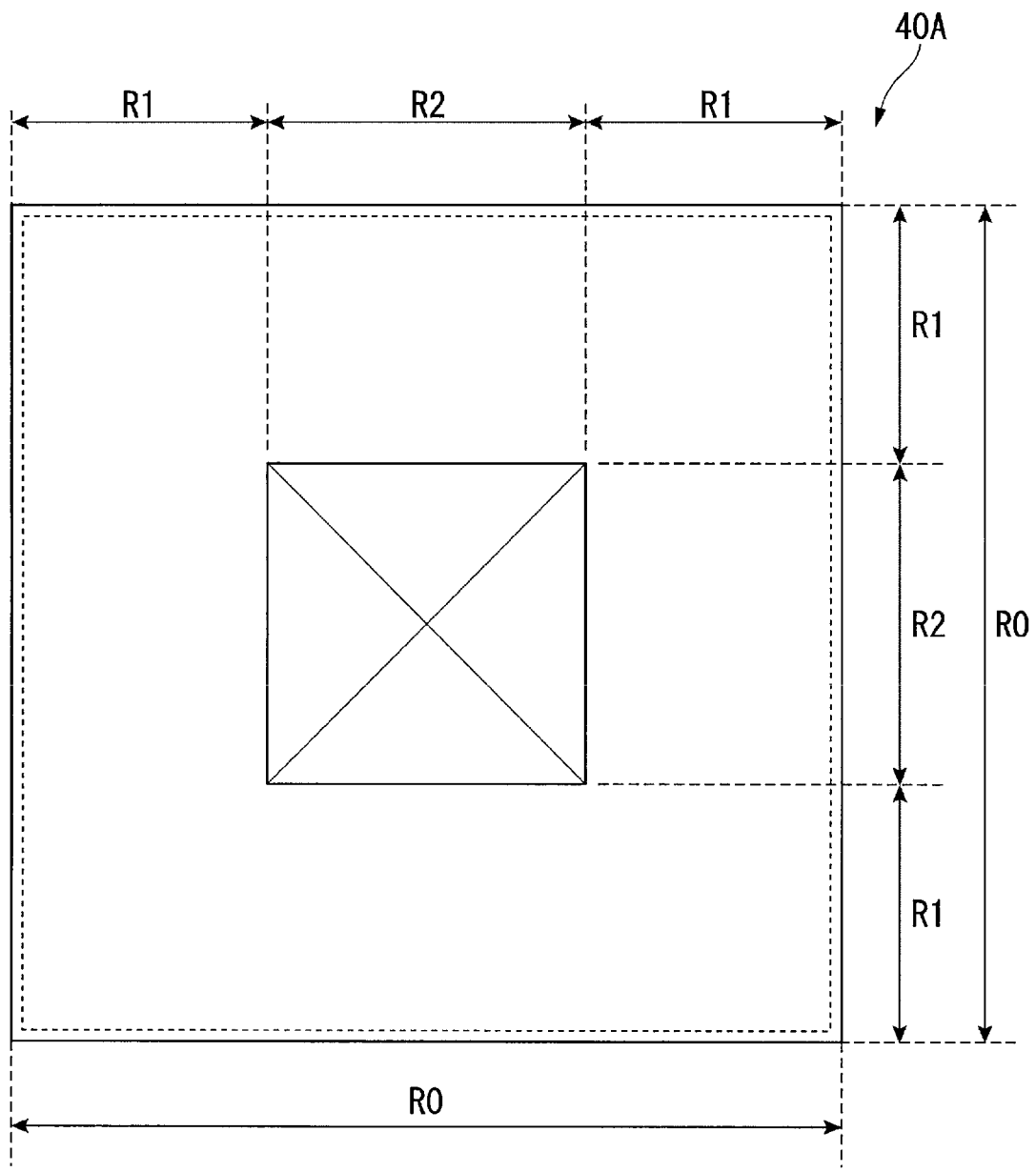

LIGHT SOURCE APPARATUS AND PROJECTOR

The present application is based on, and claims priority from JP Application Serial Number 2018-060878, filed Mar. 27, 2018, the disclosure of which is hereby incorporated by reference herein in its entirety.

BACKGROUND

1. Technical Field

The present disclosure relates to a light source apparatus and a projector.

2. Related Art

In recent years, some illuminators for projector use fluorescence. Such an illuminator includes a phosphor (or wavelength conversion element) excited with excitation light outputted from a solid-state light source and incident on the phosphor and emits fluorescence having a wavelength different from that of the excitation light. For example, JP-A-2015-015485 discloses a light emitting module including a light wavelength conversion ceramic material (light wavelength conversion member) transparent to the light having undergone wavelength conversion. In the light emitting module, providing the light wavelength conversion ceramic material with a tapered surface improves light use efficiency.

JP-A-2015-015485 is an example of the related art.

The light emitting module described in JP-A-2015-015485 mentioned above, however, has a problem of a small number of scattering elements that scatter the light emitted from the light emitting layer and hence an increase in etendue (that is, the amount of extracted light).

SUMMARY

An advantage of some aspects of the present disclosure is to provide a light source apparatus capable of suppressing an increase in etendue, an illuminator including the light source, and a projector capable of forming a high-luminance image.

According to a first aspect of the present disclosure, there is provided a light source apparatus including an excitation light source that outputs excitation light and a wavelength converter including a transparent phosphor on which the excitation light is incident and which then emits fluorescence having a wavelength different from a wavelength of the excitation light and a base on which the transparent phosphor is provided, and the wavelength converter has a light incident area on which the excitation light is incident, a first area that causes the fluorescence to exit to part of the light incident area, a second area that differs from the first area, is surrounded by at least part of the first area when viewed in a direction in which the excitation light is incident, and causes a larger amount of the fluorescence to exit to part of the light incident area than an amount of the fluorescence that exits from the first area, and an angle changer that is provided in a portion corresponding to the second area and changes a direction in which the fluorescence travels.

In the light source apparatus according to the first aspect, the transparent phosphor may be provided in a portion corresponding to the first area. The angle changer may include a first reflector that is provided on an outer circumferential side surface of the transparent phosphor in the portion corresponding to the first area and reflects the excitation light and the fluorescence and a second reflector that is provided on the base in the portion corresponding to the second area and has a reflection surface that reflects the excitation light incident on the reflection surface to the transparent phosphor and reflects the fluorescence emitted from the transparent phosphor in a direction parallel to but opposite the direction in which the excitation light is incident. The reflection surface may so incline as to separate away from an outer circumference of a surface of the base that is a surface on which the excitation light is incident and approach a center of the surface with distance from the surface in a thickness direction of the base.

In the light source apparatus according to the first aspect, irregularities may be formed on an inner circumferential side surface of the transparent phosphor.

In the light source apparatus according to the first aspect, the transparent phosphor may further fill a space between the first reflector and the second reflector in a direction along the surface of the base that is the surface on which the excitation light is incident.

In the light source apparatus according to the first aspect, the transparent phosphor may be provided in a portion corresponding to the first area and a portion corresponding to part of the second area. The angle changer may include a first reflector that is provided on an outer circumferential side surface of the transparent phosphor in the portion corresponding to the first area and reflects the excitation light and the fluorescence and a first refractor that is provided on the base in the portion corresponding to the second area and has a first refraction surface that refracts the excitation light incident on the first refraction surface to the transparent phosphor and refracts the fluorescence emitted from the transparent phosphor in a direction parallel to but opposite the direction in which the excitation light is incident. The first refraction surface may so incline as to separate away from an outer circumference of a surface of the base that is a surface on which the excitation light is incident and approach a center of the surface with distance from the surface in a thickness direction of the base.

In the light source apparatus according to the first aspect, the transparent phosphor may be provided in a portion corresponding to the first area and a portion corresponding to part of the second area. The angle changer may include a first reflector that is provided on an outer circumferential side surface of the transparent phosphor in the portion corresponding to the first area and reflects the excitation light and the fluorescence and a second refractor that is provided on the base in the portion corresponding to the second area and has a second refraction surface that refracts the excitation light incident on the second refraction surface to the transparent phosphor and refracts the fluorescence emitted from the transparent phosphor in a direction parallel to but opposite the direction in which the excitation light is incident. The second refraction surface may so incline as to separate away from a center of a surface of the base that is a surface on which the excitation light is incident and approach an outer circumference of the surface with distance from the surface in a thickness direction of the base.

In the light source apparatus according to the first aspect, a fluorescence reflector that transmits the excitation light and reflects the fluorescence may be provided on a surface of the first area of the transparent phosphor that is a surface on which the excitation light is incident.

According to a second aspect of the present disclosure, there is provided a projector including the light source apparatus described above, a light modulator that modulates light from the light source apparatus in accordance with image information to form image light, and a projection system that projects the image light.

BRIEF DESCRIPTION OF THE DRAWINGS

FIG. 3B is a plan view showing the configuration of the wavelength converter in the illuminator shown in FIG. 2.

DESCRIPTION OF EXEMPLARY EMBODIMENTS

Figure 1:
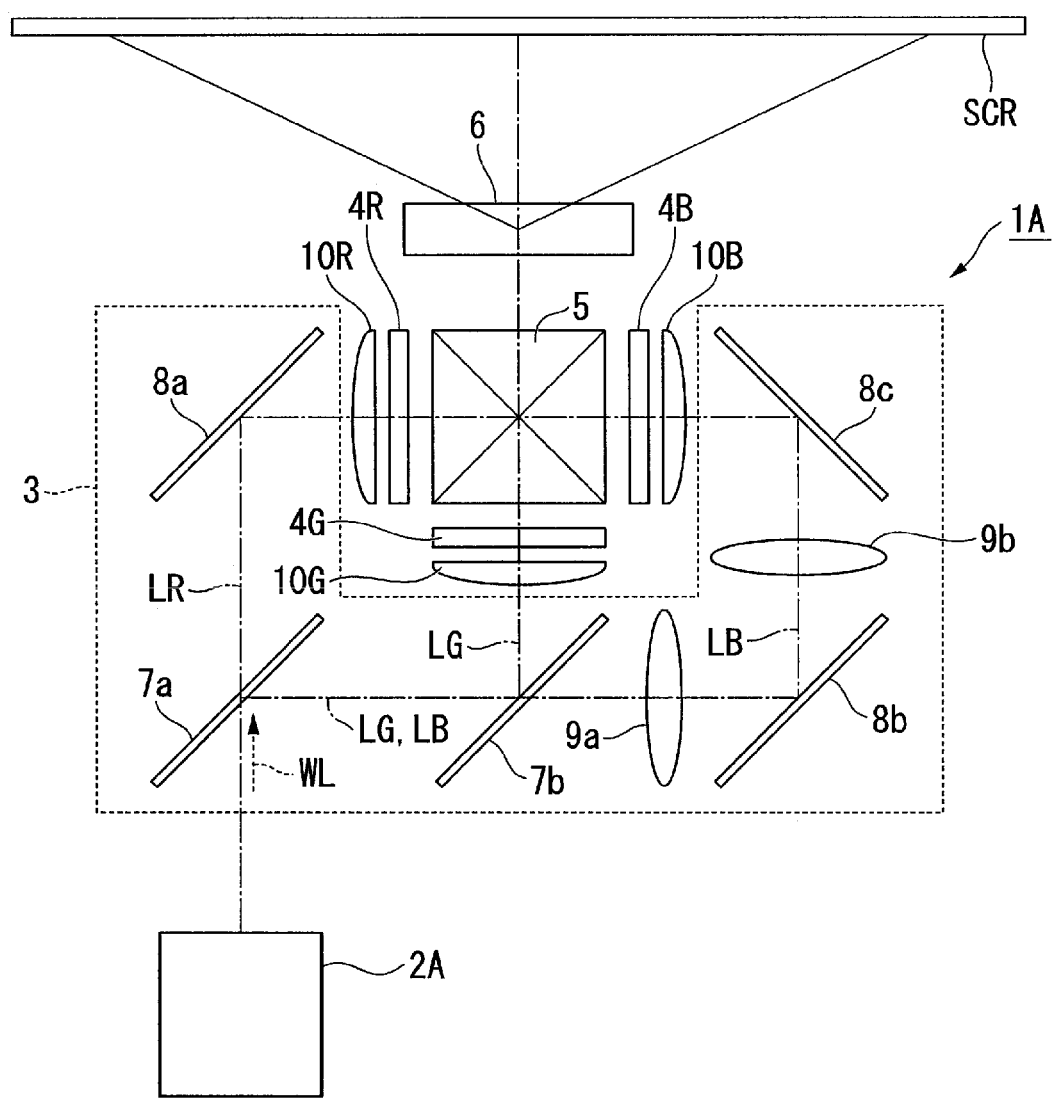
FIG. 1 is a schematic view showing the configuration of a projector according to a first embodiment.

Embodiments of the present disclosure will be described below in detail with reference to the drawings.

In the drawings used in the following description, a characteristic portion is enlarged for convenience in some cases for clarity of the characteristic thereof, and the dimension ratio and other factors of each component are therefore not always equal to actual values.

First Embodiment

An example of a light source apparatus and a projector according to a first embodiment of the present disclosure will first be described. FIG. 1 is a schematic view showing the configuration of a projector 1A according to the first embodiment.

Projector

A projector 1A according to the first embodiment is a projection-type image display apparatus that displays color video images on a screen SCR, as shown in FIG. 1. The projector 1A includes an illuminator 2A, a color separation system 3, a light modulator 4R, a light modulator 4G, a light modulator 4B, a light combiner 5, and a projection system 6.

Figure 2:
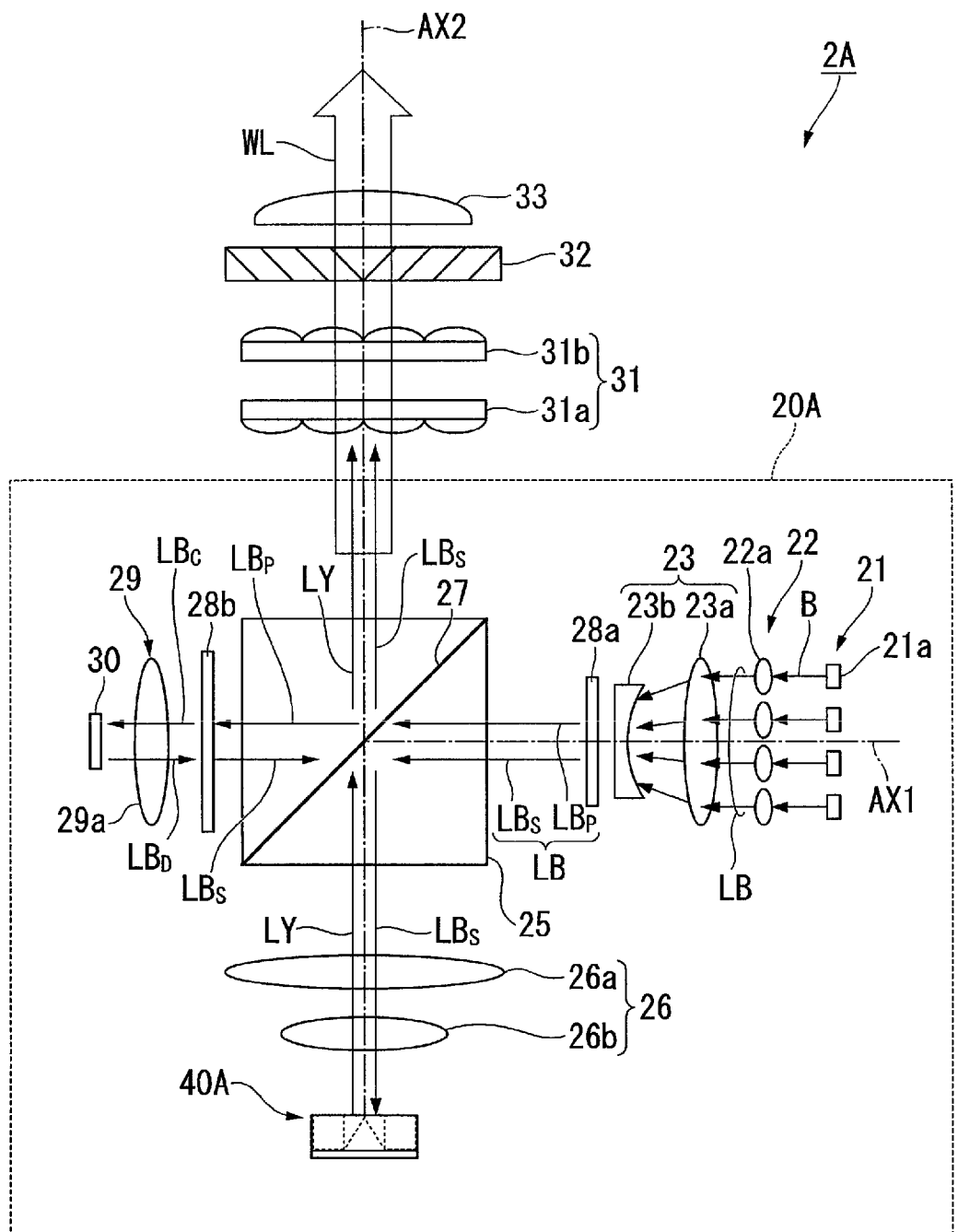
FIG. 2 is a schematic view of an illuminator of the projector shown in FIG. 1.

The illuminator 2A outputs illumination light WL containing at least light fluxes having the three primary colors, that is, red light LR, green light LG, and blue light LB (see FIG. 2). The color separation system 3 separates the illumination light WL into the red light LR, the green light LG, and the blue light LB. In the present specification, the red light LR refers to visible red light having a wavelength at which the intensity of the light peaks and which is longer than or equal to 590 nm but shorter than or equal to 700 nm, the green light LG refers to visible green light having a peak wavelength longer than or equal to 500 nm but shorter than or equal to 590 nm, and the blue light LB refers to visible blue light having a peak wavelength longer than or equal to 400 nm but shorter than or equal to 500 nm.

The color separation system 3 includes a first dichroic mirror 7a, a second dichroic mirror 7b, a first total reflection mirror 8a, a second total reflection mirror 8b, and a third total reflection mirror 8c. The first dichroic mirror 7a separates the illumination light WL from the illuminator 2A into the red light LR and the other light (blue light LB and green light LG). The first dichroic mirror 7a reflects the blue light LB and the green light LG and transmits the red light LR. The second dichroic mirror 7b reflects the green light LG and transmits the blue light LB.

The first total reflection mirror 8a reflects the red light LR toward the light modulator 4R. The second total reflection mirror 8b and the third total reflection mirror 8c guide the blue light LB to the light modulator 4B. The green light LG is reflected off the second dichroic mirror 7b toward the light modulator 4G.

The first relay lens 9a and the second relay lens 9b are disposed in the optical path of the blue light LB on the downstream side of the second dichroic mirror 7b.

The light modulator 4B modulates the blue light LB in accordance with image information to form blue image light. The light modulator 4G modulates the green light LG in accordance with image information to form green image light. The light modulator 4R modulates the red light LR in accordance with image information to form red image light. A transmissive liquid crystal panel is, for example, used as each of the light modulators 4B, 4G, and 4R.

Polarizers that are not shown are disposed on the light incident side and the light exiting side of each of the light modulators 4B, 4G, and 4R. Field lenses 10B, 10G, and 10R are disposed on the light incident side of the light modulators 4B, 4G, and 4R, respectively.

The image light fluxes from the light modulators 4B, 4G, and 4R enter the light combiner 5. The light combiner 5 combines the blue, green, and red image light fluxes with one another and causes the combined image light to exit toward the projection system 6. A cross dichroic prism is, for example, used as the light combiner 5.

The projection system 6 enlarges the combined image light from the light combiner 5 and projects the enlarged image light toward the screen SCR. Enlarged color video images are displayed on the screen SCR. The projection system 5 is formed, for example, of a lens barrel and a lens unit formed of a plurality of lenses disposed in the lens barrel.

Illuminator

The configuration of the illuminator 2A mentioned above will subsequently be described in detail. FIG. 2 is a schematic view showing the configuration of the illuminator 2A. The illuminator 2A includes a light source apparatus 20A according to the first embodiment of the present disclosure, an optical integration system 31, a polarization conversion element 32, and a superimposing lens 33, as shown in FIG. 2.

Light Source Apparatus

The light source apparatus 20A includes an excitation light source 21, a collimator system 22, an afocal system 23, a first retardation film 28a, a direction conversion element 25 including a polarization separation element 27, a first light collection system 26, a wavelength converter 40A, a second retardation film 28b, a second light collection system 29, and a diffusive reflection element 30.

The excitation light source 21, the collimator system 22, the afocal system 23, the first retardation film 28a, the direction conversion element 25, the second retardation film 28b, the second light collection system 29, and the diffusive reflection element 30 are sequentially arranged along an optical axis AX1. The wavelength converter 40A, the first light collection system 26, the direction conversion element 25, the optical integration system 31, the polarization conversion element 32, and the superimposing lens 33a are sequentially arranged along an optical axis AX2. The optical axes AX1 and AX2 are present in the same plane and perpendicular to each other. The optical axis AX2 corresponds to an illumination optical axis of the illuminator 2A.

The excitation light source 21 includes a plurality of semiconductor lasers 21a. The plurality of semiconductor lasers 21a are arranged in an array in a plane perpendicular to the optical axis AX1. In the first embodiment, the semiconductor lasers 21a each emit, for example, a blue laser beam B having emitted light intensity that peaks in a range from 430 to 480 nm and having a peak wavelength of 460 nm. The blue laser beam B is assumed to be linearly polarized light. That is, the excitation light source 21 outputs blue light (excitation light) LB formed of a plurality of blue laser beams B.

The blue light LB outputted from the excitation light source 21 enters the collimator system 22. The collimator system 22 is formed, for example, of a plurality of collimator lenses 22a arranged in an array. The plurality of collimator lenses 22a are disposed in accordance with the relative positions of the plurality of semiconductor lasers 21a. The collimator lenses 22a each convert the light beam B outputted from the corresponding semiconductor laser 21a into parallelized light. That is, the collimator system 22 converts the blue light LB outputted from the excitation light source 21 into parallelized light.

The blue light LB having passed through the collimator system 22 enters the afocal system 23. The afocal system 23 adjusts the light flux diameter of the blue light LB. The afocal system 23 is formed, for example, of a convex lens 23a and a concave lens 23b.

The blue light LB having passed through the afocal system 23 enters the first retardation film 28a. The first retardation film 28a is, for example, a half wave plate so configured that the optic axis thereof is rotatable around the optical axis AX1. Appropriately setting the angle of rotation of the first retardation film 28a with respect to the optical axis AX1 allows the blue light LB having passed through the first retardation film 28a to be blue light LB containing a S-polarized component and a P-polarized component with respect to the polarization separation element 27 mixed with each other at a predetermined ratio.

Blue light $LB_S$ formed of the S-polarized component and Blue light $LB_P$ formed of the P-polarized component having passed through the first retardation film 28a enter the direction conversion element 25. When a description common to the blue light $LB_S$ and $LB_P$ is made in the following description, the blue light formed of one of the polarized components and the blue light formed of the other are both called the blue light LB. The direction conversion element 25 is formed, for example, of a wavelength-selective dichroic prism. The dichroic prism includes the polarization separation element 27, which has a film-like shape and inclines by 45° with respect to both the optical axes AX1 and AX2. The direction conversion element 25 is not limited to be a prism-shaped element, such as that shown in FIG. 2 by way of example, but may instead be a plate-shaped element.

The polarization separation element 27 reflects the blue light $LB_S$ and transmits the blue light $LB_P$. The polarization separation element 27 transmits fluorescence LY, which has a wavelength (that is, color) different from the wavelength of the blue light LB, irrespective of the polarization state of the fluorescence LY. In the first embodiment, the fluorescence LY is assumed to be yellow light containing the green light LG and the red light LR. That is, the polarization separation element 27 has a wavelength-selective polarization separation characteristic of separating the S-polarized and P-polarized components of light having a wavelength that belongs to the blue light region from each other but transmitting the S-polarized and P-polarized components of light having a wavelength that belongs to the green and red light regions.

The S-polarized blue light $LB_S$ reflected off the polarization separation element 27 enters the first light collection system 26. The first light collection system 26 is formed, for example, of a first lens 26a and a second lens 26b. The first light collection system 26 collects the blue light $LB_S$ and directs the collected blue light $LB_S$ toward the wavelength converter 40A.

The wavelength converter 40A converts the blue light $LB_S$ incident thereon via the first light collection system 26 into the fluorescence LY, which contains the green light LG and the red light LR, and outputs the fluorescence LY. The configuration of the wavelength converter 40A will be described later.

The fluorescence LY outputted from the wavelength converter 40A is parallelized by the first light collection system 26 and enters the direction conversion element 25. The fluorescence LY is incoherent light and is therefore not polarized. Since the polarization separation element 27 has the polarization separation characteristic as described above, the fluorescence LY having passed through the first light collection system 26 passes through the polarization separation element 27 along the optical axis AX2 and enters the optical integration system 31.

On the other hand, the P-polarized blue light $LB_P$ having passed through the polarization separation element 27 in the direction along the optical axis AX1 is converted by the second retardation film 28b, for example, into right-handed circularly polarized blue light $BL_C$, which enters the second light collection system 29. The second retardation film 28b is formed of a quarter wave plate. The second light collection system 29 is formed, for example, of a biconvex lens 29a and causes the blue light $BL_C$ to be collected and incident on the diffusive reflection element 30.

The diffusive reflection element 30 diffusively reflects the blue light $BL_C$ having exited out of the second light collection system 29 toward the polarization separation element 27. In the first embodiment, the blue light $BL_C$ diffusively reflected off the diffusive reflection element 30 forms blue light $BL_D$ having a roughly uniform illuminance distribution. The right-handed circularly polarized blue light $BL_C$ is reflected in the form of left-handed circularly polarized blue light $BL_D$. The diffusive reflection element 30 preferably not only reflects the blue light $BL_C$ in a Lambertian reflection scheme but does not disturb the polarization state of the blue light $LB_C$. The blue light $BL_D$ is converted by the second light collection system 29 into parallelized light, then passes through the second retardation film 28b again, which converts the blue light $LB_D$ into S-polarized blue light $LB_S$. The blue light $BL_S$ is reflected off the polarization separation element 27 toward the optical integration system 31.

The blue light $BL_S$ and the fluorescence LY are directed by the polarization separation element 27 in the same direction to form the illumination light WL, which contains the blue light $BL_S$ and the fluorescence LY and is therefore roughly white light. The illumination light WL is directed toward the optical integration system 31. The optical integration system 31 is formed, for example, of two lens arrays 31a and 31b. The lens arrays 31a and 31b each include a plurality of microlenses arranged in an array in a plane perpendicular to the optical axis AX2.

The illumination light WL having passed through the optical integration system 31 enters the polarization conversion element 32. The polarization conversion element 32 is formed of polarization separation films and retardation films. The polarization conversion element 32 converts the illumination light WL containing the non-polarized fluorescence LY into linearly polarized light.

The illumination light WL having passed through the polarization conversion element 32 enters the superimposing lens 33a. The superimposing lens 33a cooperates with the optical integration system 31 to homogenize the illuminance distribution of the illumination light WL in an area illuminated therewith. The illumination light WL is thus outputted from the illuminator 2A.

Wavelength Converter

Figure 3A:
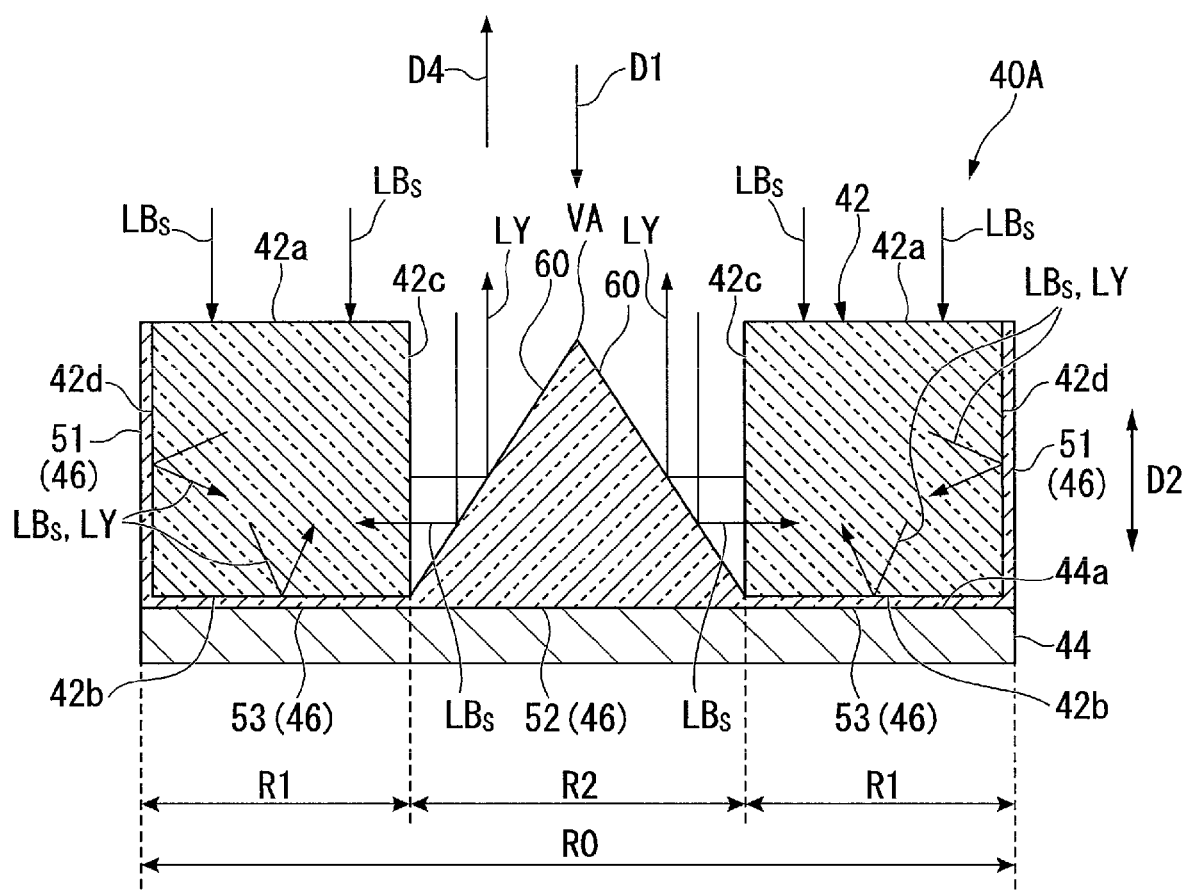
FIG. 3A is a cross-sectional view showing the configuration of a wavelength converter in the illuminator shown in FIG. 2.

FIGS. 3A and 3B show the configuration of the wavelength converter 40A. FIG. 3A is a cross-sectional view, and FIG. 3B is a plan view. The wavelength converter 40A includes a transparent phosphor 42, which emits, upon incidence of the blue light LB thereon, the fluorescence LY, which is yellow fluorescence (fluorescence having wavelength different from wavelength of excitation light), and a base 44, on which the transparent phosphor 42 is provided. The wavelength converter 40A has a light incident area R0, on which the blue light LB is incident, and a first area R1 and a second area R2, from which the fluorescence LY exits. The first area R1 causes the fluorescence LY to exit toward part of the light incident area R0. The second area R2 is an area different from the first area R1 and is surrounded by at least part of the first area R1 when viewed in a light incident direction D1, in which the blue light LB is incident, and the second area R2 causes the fluorescence LY to exit toward part of the light incident area R0 by the amount greater than the amount of fluorescence LY that exits from the first area R1. The wavelength converter 40A includes an angle changer 46, which is located in a portion corresponding to the second area R2 and changes the traveling direction of the fluorescence LY.

The transparent phosphor 42 is a phosphor so configured that total light transmittance of at least fluorescence LY is 80% or higher. The transparent phosphor may be formed of a transparent single crystal or a polycrystalline element having the total light transmittance of 80% or higher as described above and may, for example, be a ceramic phosphor made, for example, of a YAG-ceramic-based material formed of a plurality of sintered YAG phosphor particles.

The base 44 is a plate-shaped member and a support structure that supports the transparent phosphor 42. The base 44 is not necessarily formed of a specific member and may be formed of a metal member made of aluminum, copper, or any other reflective material. The base 44 formed of a high thermal conductor made, for example, of aluminum and copper, preferably dissipates heat generated in the transparent phosphor 42 out of the wavelength converter 40A.

In the first embodiment, the transparent phosphor 42 is provided via a third reflector 53, which will be described later, in a portion of a front surface 44a of the base 44 that is the portion facing the side on which the blue light LB is incident and corresponding to the first area R1. The transparent phosphor 42 has a roughly fixed width in the light incident direction D1. The transparent phosphor 42 preferably has a slightly optically roughened inner wall surface (inner circumferential side surface) 42c. Specifically, the inner wall surface 42c has an optical shape capable of diffusing the fluorescence LY, such as minute irregular texture (irregularities) and a random pattern. A dielectric multilayer film that transmits the blue light LB and reflects the fluorescence LY may be provided on the front surface 42a of the transparent phosphor 42. Providing such a dielectric multilayer film allows reduction in the amount of yellow light that exits from the first area R1 in the outward directions from the transparent phosphor 42 primarily including the direction parallel to but opposite the light incident direction D1 (light exiting direction D4 shown in FIGS. 3A and 3B).

In the first embodiment, the angle changer 46 is formed of a first reflector 51 and a third reflector 53 in addition to a second reflector 52 provided in the portion corresponding to the second area R2. The first reflector 51 is provided on the outer wall surface (outer circumferential side surface) of the transparent phosphor 42 in the portion corresponding to the first area R1 and reflects the blue light LB and the fluorescence LY. The third reflector 53 is provided on the front surface 44a of the base 44 in the portion corresponding to the first area R1 and reflects the blue light LB and the fluorescence LY. A bottom surface 42b of the transparent phosphor 42 is in contact with the first reflector 53. The first reflector 51 and the third reflector 53 are each a mirror formed, for example, of a film on which a metal, such as silver and aluminum, is deposited or a dielectric multilayer film. The first reflector 51 and the third reflector 53 may each be directly formed on the transparent phosphor 42 or the base 44 or may be bonded thereto, for example, with an adhesive. In a case where the base 44 is made of a material capable of reflecting the blue light LB and the fluorescence LY at predetermined reflectance, the third reflector 53 can be omitted.

The second reflector 52 is provided on the front surface 44a of the base 44 in the portion corresponding to the second area R2 and reflects the blue light LB and the fluorescence LY. The second reflector 52 has a reflection surface 60, which reflects the fluorescence LY emitted from the transparent phosphor 42 in the direction parallel to but opposite the light incident direction D1, in which the excitation light LB is incident.

In the first embodiment, the second reflector 52 is formed in the form of a quadrangular pyramid that has a bottom surface extending across the first area R1 of the front surface 44a of the base 44 and tapers with distance from the front surface 44a in the light incident direction D1, in which the excitation light LB is incident. The reflection surface 60 is formed of the side surface of the quadrangular pyramid and so inclines as to separate away from the outer circumference of the front surface 44a and approach the center thereof with distance from the front surface 44a in a thickness direction D2. The second reflector 52 may entirely be made of a reflective material, such as silver and aluminum, or may be provided with a mirror formed, for example, of a film on which a metal, such as silver and aluminum, is deposited or a dielectric multilayer film and located on the side surface of a quadrangular pyramid made of a non-reflective material, such as a resin. The vertex of the quadrangular pyramid that forms the second reflector 52 is called a vertex VA.

The wavelength converter 40A is so configured that the entire light incident area R0 is irradiated with the blue light $LB_S$, as shown in FIGS. 3A and 3B. That is, the size of the wavelength converter 40A is set as appropriate in accordance with the size of the area irradiated with the blue light $LB_S$ having exited out of the first light collection system 26 shown in FIG. 2. Out of the blue light $LB_S$ incident on the light incident area R0, the blue light $LB_S$ having impinged on the surface of the transparent phosphor 42 in the first area R1 (excitation light incident surface) enters the transparent phosphor 42. Out of the blue light $LB_S$ incident on the light incident area R0, the blue light $LB_S$ having impinged on the second reflector 52 in the second area R2 is reflected off the reflection surface 60 and enters the transparent phosphor 42 via the inner wall surface 42c.

As described above, the blue light $LB_S$ having entered the transparent phosphor 42 along a plurality of directions as described above is reflected off the first reflector 51 and the third reflector 53 and excites the transparent phosphor 42. The excited transparent phosphor 42 produces the fluorescence LY, which is also reflected off the first reflector 51 and the third reflector 53, is guided through the transparent phosphor 42, and travels in the light exiting direction D4.

Out of the fluorescence LY produced in the transparent phosphor 42, the fluorescence LY that travels roughly in the light exiting direction D4 exits through the front surface 42a of the transparent phosphor 42 in the light exiting direction D4. On the other hand, out of the fluorescence LY produced in the transparent phosphor 42, the fluorescence LY that is so diffused and reflected off the first reflector 51 and the third reflector 53 as to exit through the inner wall surface 42c of the transparent phosphor 42 toward the second reflector 52 is reflected off the reflection surface 60 and exits along the light exiting direction D4. The way in which the fluorescence LY exits allows a greater amount of fluorescence LY to efficiently exit toward the second area R2 (part of light incident area R0) surrounded by the first area R1 when viewed in the light incident direction D1 than the amount of fluorescence LY that exits from the first area R1.

The light source apparatus 20A according to the first embodiment described above provides the following effect:

The light source apparatus 20A according to the first embodiment includes the excitation light source 21 and the wavelength converter 40A, which includes the transparent phosphor 42 and the base 44. The wavelength converter 40A has the light incident area R0, the first area R1, and the second area R2, and the wavelength converter 40A includes the second reflector (angle changer) 52 in the portion corresponding to the second area R2.

Figure 4:
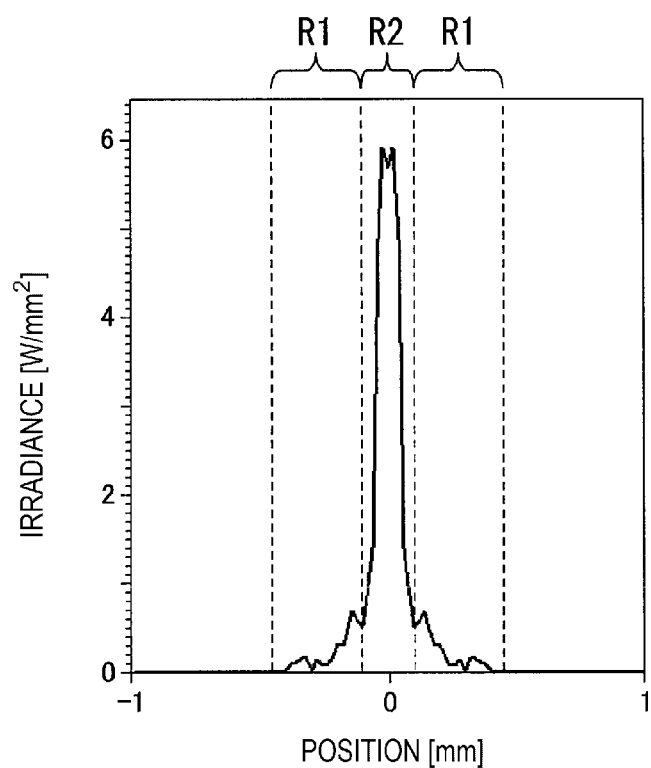
FIG. 4 shows a graph illustrating the result of numerical calculation of the irradiance distribution of fluorescence outputted from the wavelength converter shown in FIGS. 3A and 3B.

FIG. 4 shows a graph illustrating the result of numerical calculation of the irradiance distribution of the fluorescence LY outputted from the wavelength converter 40A based on a modeled structure of the wavelength converter 40A shown in FIGS. 3A and 3B.

Figure 5:
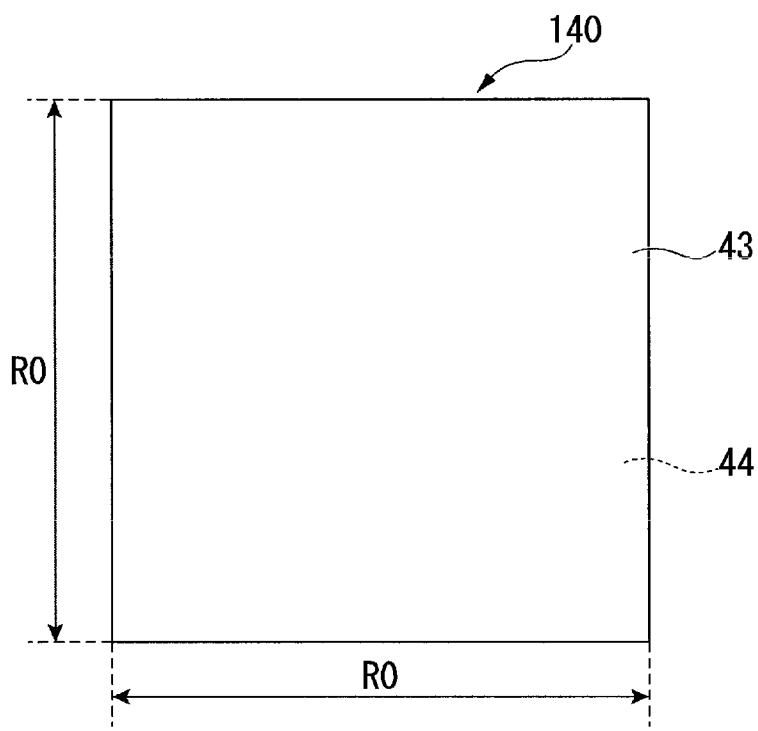
FIG. 5 is a plan view showing the configuration of a wavelength converter of related art.

On the other hand, FIG. 5 is a plan view of a wavelength converter 140 of related art having the same size as that of the wavelength converter 40A when viewed in the light incident direction D1, in which the blue light $LB_S$ is incident. The wavelength converter 140 includes a non-transparent phosphor 43 containing air bubbles, particles, or any other light scattering objects.

Figure 6:
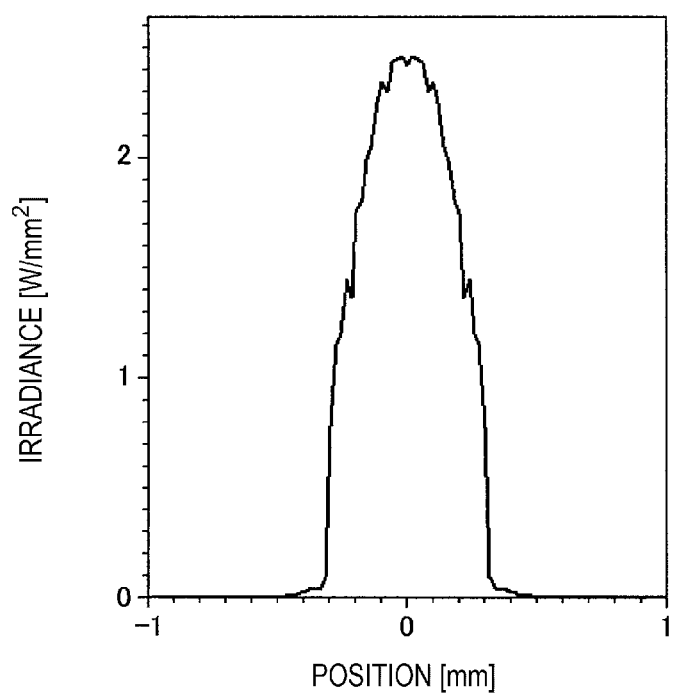
FIG. 6 shows a graph illustrating the result of numerical calculation of the irradiance distribution of fluorescence outputted from the wavelength converter shown in FIG. 5.

FIG. 6 shows a graph illustrating the result of numerical calculation of the irradiance distribution of the fluorescence LY outputted from the wavelength converter 140 based on a modeled structure of the wavelength converter 140.

In FIGS. 4 and 6, the vertical axis represents the irradiance (unit: $W/mm^2$) of the fluorescence LY. In FIG. 4, the horizontal axis represents the position (unit: mm) relative to an origin or the vertex VA of the quadrangular pyramid that forms the second reflector 52 when viewed in the light incident direction D1. Further, in FIG. 6, the horizontal axis represents the position (unit: mm) relative to an origin or the center of the non-transparent phosphor 43 viewed in the light incident direction D1, as shown in FIG. 5.

Comparison between FIGS. 4 and 6 shows that in the light source apparatus 20A according to the first embodiment, the wavelength converter 40A includes the second reflector 52, which changes the traveling direction of the fluorescence LY, in the portion corresponding to the second area R2. In practice, the thickness (height along light incident direction D1) of the transparent phosphor 42 is much smaller than the width of the light incident area R0 viewed in the light incident direction D1. The transparent phosphor 42 therefore functions as the core of a light guide structure. The fluorescence LY produced in the transparent phosphor 42 propagates in the transparent phosphor 42 in the direction parallel to the front surface 42a and the bottom surface 42b of the transparent phosphor 42 while totally reflected in the light incident direction D1 between the front surface 42a and the bottom surface 42b. As described above, the fluorescence LY that propagates in the transparent phosphor 42 is reflected off the outer wall surface 42d, where the first reflector 51 is disposed, but is incident on the inner wall surface 42c at an angle of incidence smaller than the critical angle associated with the inner wall surface 42c, therefore passes through the inner wall surface 42c, and exits toward the reflection surface 60 of the second reflector 52.

Therefore, a larger amount of fluorescence LY exits from the second area R2 than the amount of fluorescence LY that exits from the first area R1, and the fluorescence LY is narrower than the fluorescence LY that exits from the wavelength convert 140, which includes no second reflector 52, whereby an increase in etendue can be suppressed.

Further, in the light source apparatus 20A according to the first embodiment, the transparent phosphor 42 is provided in the portion corresponding to the first area R1, and the angle changer 46 includes the first reflector 51, which is provided on the outer wall surface 42d of the transparent phosphor 42 in the portion corresponding to the first area R1 and reflects the blue light $LB_S$ and fluorescence LY, and the second reflector 52, which is provided on the base 44 in the portion corresponding to the second area R2 and has the reflection surface 60. The reflection surface 60 so inclines as to separate away from the outer circumference of the front surface 44a of the base 44 and approach the center thereof with distance from the front surface 44a in the thickness direction D2. According to the thus configured light source apparatus 20A, the first reflector 51 and the reflection surface 60 of the second reflector 52 allow the interior of the transparent phosphor 42 to be efficiently irradiated with the blue light $LB_S$ incident on the wavelength converter 40A. Further, the fluorescence LY produced by the transparent phosphor 42 excited with the blue light $LB_S$ with which the transparent phosphor 42 is radiated can be collected in the second area R2, whereby a larger amount of fluorescence LY is allowed to exit from the second area R2 than the amount of fluorescence LY that exits from the first area R1. Moreover, the first reflector 51 can reduce the amount of fluorescence LY caused to exit out of the transparent phosphor 42 (outer circumference of transparent phosphor 42 when viewed in light incident direction D1, in which blue light $LB_S$ is incident), whereby a larger amount of fluorescence LY can be used as the illumination light WL.

Further, in the light source apparatus 20A according to the first embodiment, minute irregularities or an optical pattern formed on the inner wall surface 42c of the transparent phosphor 42 allows moderate diffusion and deflection of the blue light $LB_S$ that enters the transparent phosphor 42 through the inner wall surface 42c via the reflection surface 60 of the second reflector 52 and the fluorescence LY that exits from the interior of the transparent phosphor 42 via the inner wall surface 42c toward the second reflector 52, whereby the fluorescence LY produced by the transparent phosphor 42 can be collected in the second area R2, and a larger amount of fluorescence LY is allowed to exit from the second area R2 than the amount of fluorescence LY that exits from the first area R1. The fluorescence LY that is produced in the transparent phosphor 42, then guided through the transparent phosphor 42, and incident on the inner wall surface 42c at an angle of incidence smaller than the critical angle is effectively diffused and deflected, as described above.

The projector 1A according to the first embodiment described above provides the following effect.

The projector 1A according to the first embodiment includes the light source apparatus 20A according to the first embodiment, the light modulators 4B, 4G, and 4R, which modulate the blue light LB, the green light LG, and the red light LR from the light source apparatus 20A in accordance with image information to form image light fluxes, and the projection system 6, which projects the image light fluxes described above. The thus configured projector 1A according to the first embodiment can form and project a high-luminance image by using the light source apparatus 20A, which suppresses an increase in etendue.

Second Embodiment

A light source apparatus and a projector according to a second embodiment will subsequently be described. The second embodiment differs from the first embodiment in terms of the configuration of the wavelength converter in the light source apparatus, and the other configurations are the same in the two embodiments. Therefore, the following description will be primarily made of the configuration of the wavelength converter, and configurations and members common to those in the first embodiment have the same reference characters and will not be described in detail.

Figure 7:
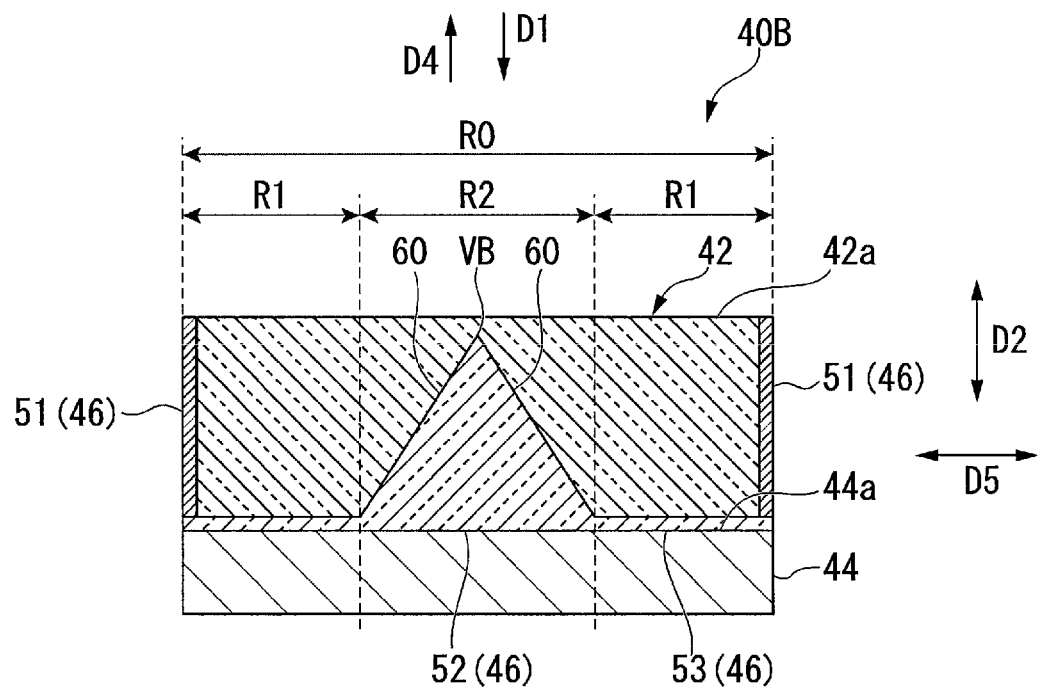
FIG. 7 is a cross-sectional view showing the configuration of a wavelength converter according to a second embodiment.

FIG. 7 is a cross-sectional view showing the configuration of a wavelength converter 40B in the second embodiment. The configuration of wavelength converter 40B differs from that of the wavelength converter 40A in that the transparent phosphor 42 fills the space between the first reflector 51 and the second reflector 52 in the direction of a plane (direction) D5 extending along the front surface 44a of the base 44, as shown in FIG. 7. The vertex of the quadrangular pyramid that forms the second reflector 52 is called a vertex VB. In the second embodiment, the transparent phosphor 42 is so formed as to be as roughly high as the second reflector 52 or higher than the vertex VB of the second reflector 52 in the thickness direction D2. That is, the second reflector 52 is roughly buried in the transparent phosphor 42.

The light source apparatus and the projector according to the second embodiment described above provide the following effects.

The light source apparatus and the projector according to the second embodiment, which have the same basic configurations as those of the light source apparatus and the projector according to the first embodiment, provide the same advantageous effect as that provided by the light source apparatus and the projector according to the first embodiment. That is, in the light source apparatus according to the second embodiment, since the wavelength converter 40B includes the second reflector 52, which changes the traveling direction of the fluorescence LY, in the portion corresponding to the second area R2, a larger amount of fluorescence LY is allowed to exit from the second area R2 than the amount of fluorescence LY that exits from the first area R1, and the fluorescence LY can be narrower than the fluorescence LY that exits from the wavelength convert 140, which includes no second reflector 52, whereby an increase in etendue can be suppressed. Further, the projector according to the second embodiment can form and project a high-luminance image by using the light source apparatus that suppresses an increase in etendue.

Moreover, in the wavelength converter 40B in the light source apparatus according to the second embodiment, since the transparent phosphor 42 fills the space between the first reflector 51 and the second reflector 52 in the plane direction D5, the amount (volume) of the transparent phosphor 42 can be increased as compared with the amount (volume) of the wavelength converter 40A in the first embodiment, whereby a larger amount of blue light $LB_S$ can be received.

Figure 8:
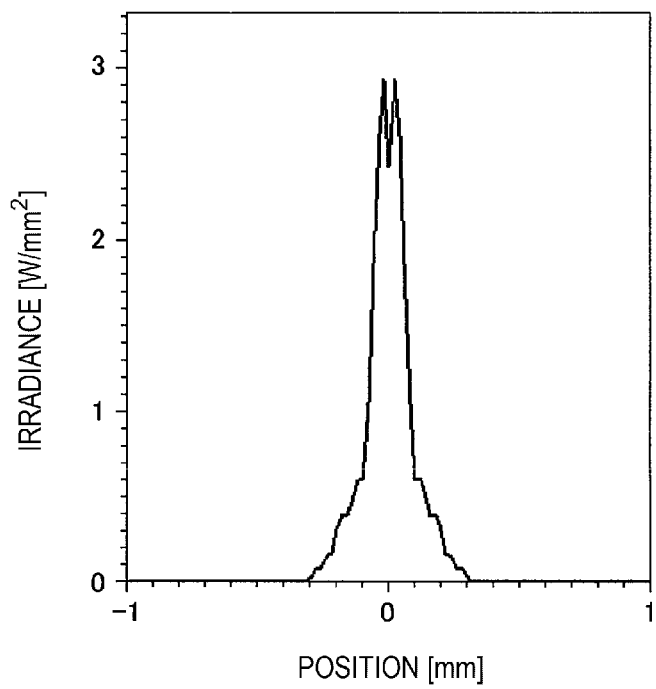
FIG. 8 shows a graph illustrating the result of numerical calculation of the irradiance distribution of fluorescence outputted from the wavelength converter shown in FIG. 7.

FIG. 8 shows a graph illustrating the result of numerical calculation of the irradiance distribution of the fluorescence LY outputted from the wavelength converter 40B based on a modeled structure of the wavelength converter 40B shown in FIG. 7.

In FIG. 8, the vertical axis represents the irradiance (unit: W/mm$^2$) of the fluorescence LY. In FIG. 8, the horizontal axis represents the position (unit: mm) relative to an origin or the vertex VB of the quadrangular pyramid that forms the second reflector 52 when viewed in the light incident direction D1.

Comparison between FIGS. 8 and 6 shows that in the light source apparatus according to the second embodiment, since the wavelength converter 40B includes the second reflector 52 in the portion corresponding to the second area R2, a amount of fluorescence LY that exits from the second area R2 is larger than the amount of fluorescence LY that exits from the first area R1, and the fluorescence LY can be narrower than the fluorescence LY that exits from the wavelength convert 140, which includes no second reflector 52, whereby an increase in etendue can be suppressed, as in the first embodiment. Further, resulting from the fact that the second area R2 is filled with the transparent phosphor 42, the foot of the irradiance distribution of the fluorescence LY outputted from the wavelength converter 40B toward the second area R2 slightly broadens as compared with the foot of the irradiance distribution of the fluorescence LY outputted from the wavelength converter 40A, and two high-contrast peaks are created in the first area R1.

Third Embodiment

A light source apparatus and a projector according to a third embodiment will subsequently be described. The third embodiment differs from the second embodiment in terms of the configuration of the wavelength converter in the light source apparatus, and the other configurations are the same in the two embodiments. Therefore, the following description will be primarily made of the configuration of the wavelength converter, and configurations and members common to those in the second embodiment have the same reference characters and will not be described in detail.

Figure 9:
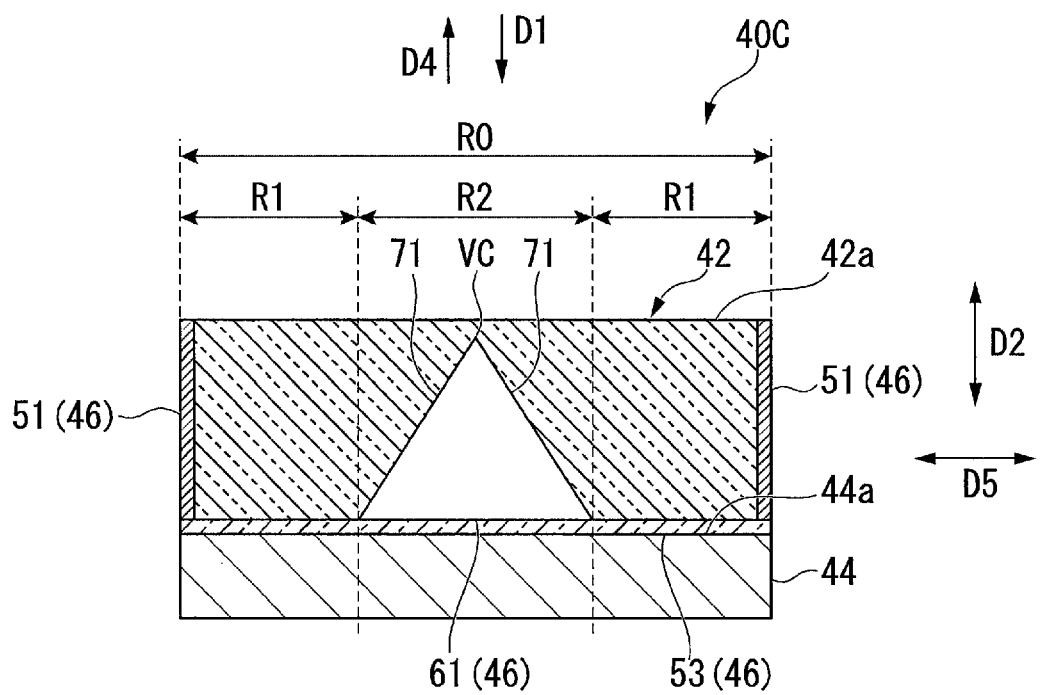
FIG. 9 is a cross-sectional view showing the configuration of a wavelength converter according to a third embodiment.

FIG. 9 is a cross-sectional view showing the configuration of a wavelength converter 40C in the third embodiment. The configuration of wavelength converter 40C differs from that of the wavelength converter 40B in that the second reflector 52 is replaced with a first refractor 61, as shown in FIG. 9. That is, the first refractor 61 is provided in the portion corresponding to the second reflector 52 and has a first refraction surface 71, which refracts the blue light $LB_S$ incident thereon toward the transparent phosphor 42 and refracts the fluorescence LY emitted from the transparent phosphor 42 in the light exiting direction D4. The vertex of the quadrangular pyramid that forms the first refractor 61 is called a vertex VC. The first refraction surface 71 so inclines as to separate away from the outer circumference of the front surface 44a of the base 44 and approach the center thereof (that is, vertex VC) with distance from the front surface 44a in the thickness direction D2.

The first refractor 61 only needs to be provided in the portion corresponding to the second reflector 52 and have the first refraction surface 71, which can refract the blue light $LB_S$ and the fluorescence LY over an angular range as described above. Therefore, the first refractor 61 may be formed in the form of an air space in the transparent phosphor 42 or may be buried in the transparent phosphor 42 in the form of a medium having a refractive index different from the refractive index of the transparent phosphor 42.

In the wavelength converter 40C, out of the blue light $LB_S$ incident on the light incident area R0, the blue light $LB_S$ having impinged on the first refractor 61 in the second area R2 is refracted by the first refraction surface 71, and the transparent phosphor 42 is then irradiated with the refracted blue light $LB_S$. Out of the fluorescence LY produced in the transparent phosphor 42, the fluorescence LY that travels toward the first refractor 61 is refracted by the first refraction surface 71 and exits along the light exiting direction D4. The way in which the fluorescence LY exits allows a greater amount of fluorescence LY to efficiently exit toward the second area R2 surrounded by the first area R1 when viewed in the light incident direction D1 than the amount of fluorescence LY that exits from the first area R1.

The light source apparatus and the projector according to the third embodiment described above provide the following effects.

The light source apparatus and the projector according to the third embodiment, which have the same basic configurations as those of the light source apparatus and the projector according to the first embodiment, provide the same advantageous effect as that provided by the light source apparatus and the projector according to the first embodiment. That is, in the light source apparatus according to the third embodiment, since the wavelength converter 40C includes the first refractor 61, which changes the traveling direction of the fluorescence LY, in the portion corresponding to the second area R2, a larger amount of fluorescence LY is allowed to exit from the second area R2 than the amount of fluorescence LY that exits from the first area R1, and the fluorescence LY can be narrower than the fluorescence LY that exits from the wavelength convert 140, which includes no second reflector 52, whereby an increase in etendue can be suppressed. Further, the projector according to the third embodiment can form and project a high-luminance image by using the light source apparatus that suppresses an increase in etendue.

Further, in the wavelength converter 40C in the light source apparatus according to the third embodiment, since the space between the first reflector 51 and the first refractor 61 is filled with the transparent phosphor 42 in the plane direction D5, and the blue light $LB_S$ and the fluorescence LY are refracted by the first refraction surface 71, a larger amount of fluorescence LY is allowed to exit from the second area R2 than the amount of fluorescence LY that exits from the first area R1.

Figure 10:
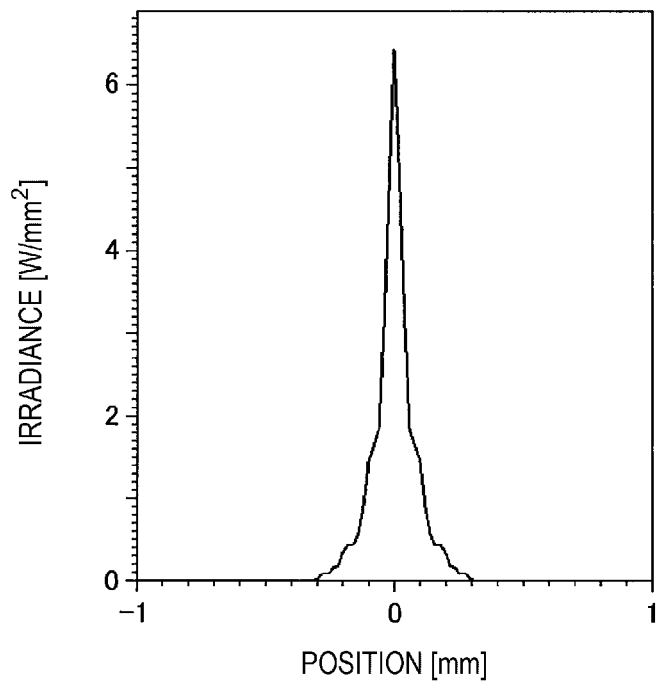
FIG. 10 shows a graph illustrating the result of numerical calculation of the irradiance distribution of fluorescence outputted from the wavelength converter shown in FIG. 9.

FIG. 10 shows a graph illustrating the result of numerical calculation of the irradiance distribution of the fluorescence LY outputted from the wavelength converter 40C based on a modeled structure of the wavelength converter 40C shown in FIG. 9.

In FIG. 10, the vertical axis represents the irradiance (unit: $W/mm^2$) of the fluorescence LY. In FIG. 10, the horizontal axis represents the position (unit: mm) relative to an origin or the vertex VC of the quadrangular pyramid that forms the first refractor 61 when viewed in the light incident direction D1.

Comparison between FIGS. 10 and 6 shows that in the light source apparatus according to the third embodiment, since the wavelength converter 40C includes the first refractor 61 in the portion corresponding to the second area R2, a larger amount of fluorescence LY is more smoothly allowed to exit from the second area R2 than the amount of fluorescence LY that exits from the first area R1, and the fluorescence LY can be narrower than the fluorescence LY that exits from the wavelength convert 140, which includes no first refractor 61, whereby an increase in etendue can be suppressed, as in the second embodiment. Further, resulting from the fact that the second area R2 is replaced with the first refractor 61, the shape of the foot of the irradiance distribution of the fluorescence LY outputted from the wavelength converter 40C toward the second area R2 changes as compared with the shape of the foot of the irradiance distribution of the fluorescence LY outputted from the wavelength converter 40B (see FIG. 8), and a single high peak is created in the first area R1.

Fourth Embodiment

A light source apparatus and a projector according to a fourth embodiment will subsequently be described. The fourth embodiment differs from the third embodiment in terms of the configuration of the wavelength converter in the light source apparatus, and the other configurations are the same in the two embodiments. Therefore, the following description will be primarily made of the configuration of the wavelength converter, and configurations and members common to those in the third embodiment have the same reference characters and will not be described in detail.

Figure 11:
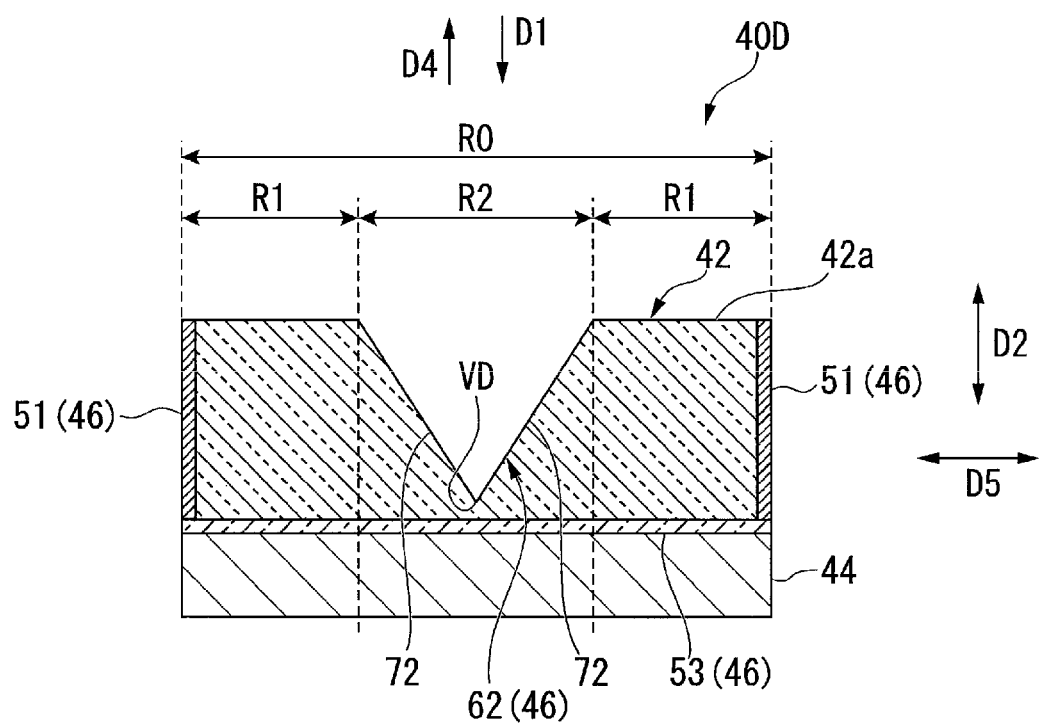
FIG. 11 is a cross-sectional view showing the configuration of a wavelength converter according to a fourth embodiment.

FIG. 11 is a cross-sectional view showing the configuration of a wavelength converter 40D in the fourth embodiment. The configuration of wavelength converter 40D differs from that of the wavelength converter 40C in that the first refractor 61 is replaced with a second refractor 62, as shown in FIG. 11. The second refractor 62 is provided in the portion corresponding to the second reflector 52 and has a second refraction surface 72, which refracts the blue light $LB_S$ incident thereon toward the transparent phosphor 42 and refracts the fluorescence LY emitted from the transparent phosphor 42 in the light exiting direction D4. The vertex of the quadrangular pyramid that forms the second refractor 62 is called a vertex VD. The second refraction surface 72 so inclines as to separate away from the center of the front surface 44a of the base 44 and approach the outer circumference thereof with distance from the front surface 44a in the thickness direction D2. That is, the second refractor 62 is the first refractor 61 (see FIG. 9) inverted along the thickness direction D2.

The second refractor 62 only needs to be provided in the portion corresponding to the second reflector 52 and have the second refraction surface 72, which can refract the blue light $LB_S$ and the fluorescence LY over an angular range as described above. Therefore, the second refractor 62 may be formed in the form of a cutout in the transparent phosphor 42 or may be so formed in the form of a medium having a refractive index different from the refractive index of the transparent phosphor 42 that the rear side the second refractor 62 is exposed out of the transparent phosphor 42, as in the third embodiment.

In the wavelength converter 40D, out of the blue light $LB_S$ incident on the light incident area R0, the blue light $LB_S$ having impinged on the second refractor 62 in the second area R2 is refracted by the second refraction surface 72, and the transparent phosphor 42 is then irradiated with the refracted blue light $LB_S$. Out of the fluorescence LY produced in the transparent phosphor 42, the fluorescence LY that travels toward the second refractor 62 is refracted by the second refraction surface 72 and exits along the light exiting direction D4. The way in which the fluorescence LY exits allows a greater amount of fluorescence LY to efficiently exit toward the second area R2 surrounded by the first area R1 when viewed in the light incident direction D1 than the amount of fluorescence LY that exits from the first area R1.

The light source apparatus and the projector according to the fourth embodiment described above provide the following effects.

The light source apparatus and the projector according to the fourth embodiment, which have the same basic configurations as those of the light source apparatus and the projector according to the first embodiment, provide the same advantageous effect as that provided by the light source apparatus and the projector according to the first embodiment. That is, in the light source apparatus according to the fourth embodiment, since the wavelength converter 40D includes the second refractor 62, which changes the traveling direction of the fluorescence LY, in the portion corresponding to the second area R2, a larger amount of fluorescence LY is allowed to exit from the second area R2 than the amount of fluorescence LY that exits from the first area R1, and the fluorescence LY can be narrower than the fluorescence LY that exits from the wavelength convert 140, which includes no second reflector 52, whereby an increase in etendue can be suppressed. Further, the projector according to the fourth embodiment can form and project a high-luminance image by using the light source apparatus that suppresses an increase in etendue.

Further, in the wavelength converter 40D in the light source apparatus according to the fourth embodiment, since the space between the first reflector 51 and the second refractor 62 is filled with the transparent phosphor 42 in the plane direction D5, and the blue light $LB_S$ and the fluorescence LY are refracted by the second refraction surface 72, a larger amount of fluorescence LY is allowed to exit from the second area R2 than the amount of fluorescence LY that exits from the first area R1, as in the third embodiment.

Figure 12:
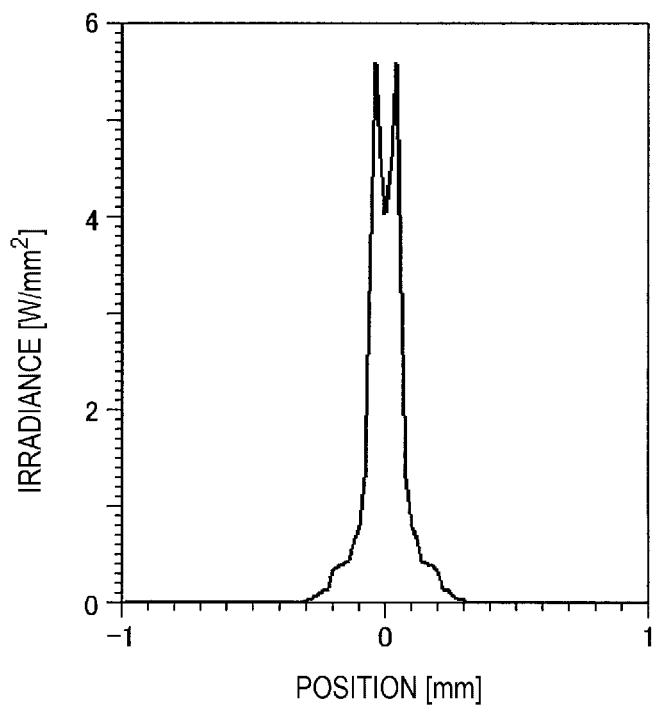
FIG. 12 shows a graph illustrating the result of numerical calculation of the irradiance distribution of fluorescence outputted from the wavelength converter shown in FIG. 11.

FIG. 12 shows a graph illustrating the result of numerical calculation of the irradiance distribution of the fluorescence LY outputted from the wavelength converter 40D based on a modeled structure of the wavelength converter 40D shown in FIG. 11.

In FIG. 12, the vertical axis represents the irradiance (unit: $W/mm^2$) of the fluorescence LY. In FIG. 12, the horizontal axis represents the position (unit: mm) relative to an origin or the vertex VD of the quadrangular pyramid that forms the second refractor 62 when viewed in the light incident direction D1.

Comparison between FIGS. 12 and 6 shows that in the light source apparatus according to the fourth embodiment, since the wavelength converter 40D includes the second refractor 62 in the portion corresponding to the second area R2, a larger amount of fluorescence LY is more smoothly allowed to exit from the second area R2 than the amount of fluorescence LY that exits from the first area R1, and the fluorescence LY can be narrower than the fluorescence LY that exits from the wavelength convert 140, which includes no second refractor 62, whereby an increase in etendue can be suppressed, as in the third embodiment. Further, resulting from the fact that the first refractor 61 is replaced with the second refractor 62, the shape of the foot of the irradiance distribution of the fluorescence LY outputted from the wavelength converter 40D toward the second area R2 narrows as compared with the shape of the foot of the irradiance distribution of the fluorescence LY outputted from the wavelength converter 40C (see FIG. 10), and two high peaks are created in the first area R1, but no large change in the peak intensity is observed.

Another Embodiment

Figure 13:
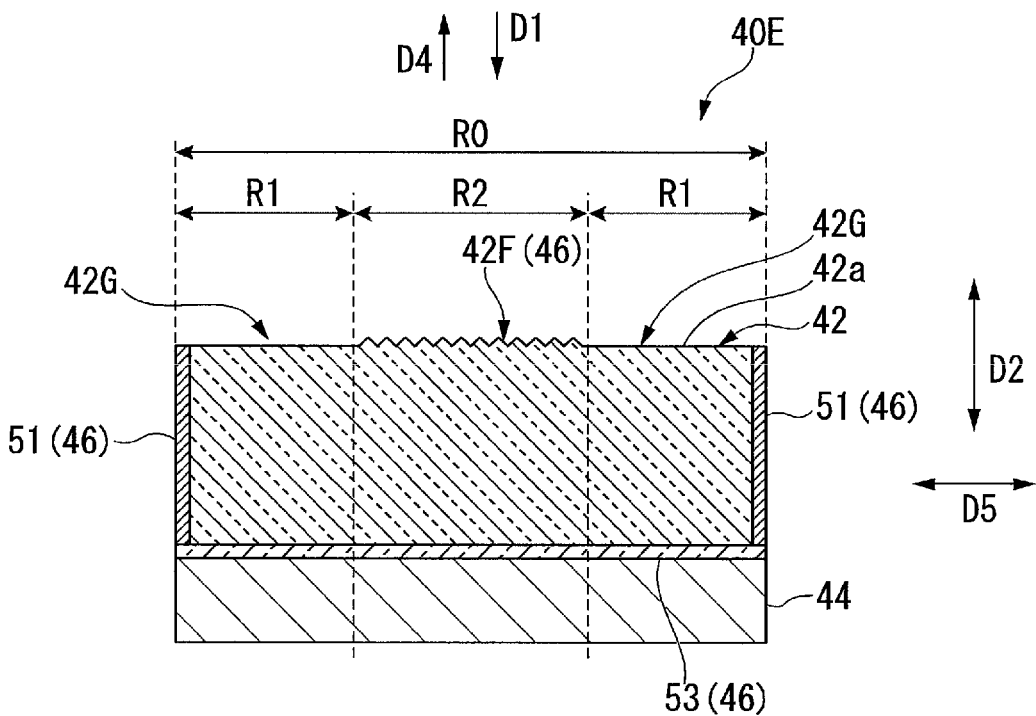
FIG. 13 is a cross-sectional view showing the configuration of a wavelength converter according to another embodiment.

A light source apparatus and a projector according to another embodiment different from the first to fourth embodiments described above will subsequently be described. FIG. 13 is a cross-sectional view showing the configuration of a wavelength converter 40E in the other embodiment. In the wavelength converter 40E, the transparent phosphor 42 has a roughly uniform thickness in the plane direction D5, as shown in FIG. 13. A portion 42F of the front surface 42a of the transparent phosphor 42 that is the portion corresponding to the second area R2 is slightly optically roughened. Specifically, the portion 42F corresponding to the second area R2 has an optical shape that causes at least the fluorescence LY to undergo multiple reflection in the transparent phosphor 42 along the thickness direction D2, such as minute irregular texture (minute irregularities) and a random pattern.

In the wavelength converter 40E, out of the blue light $LB_S$ incident on the light incident area R0, the blue light $LB_S$ incident on the front surface 42a of the transparent phosphor 42 in the portion 42F corresponding to the second area R2 is diffused and deflected, and the transparent phosphor 42 is irradiated with the diffused, deflected blue light $LB_S$. The fluorescence LY produced in the transparent phosphor 42 is multiply reflected between the portion 42F and the third reflector 53 and is therefore likely to exit along the light exiting direction D4. The way in which the fluorescence LY exits allows a greater amount of fluorescence LY to efficiently exit toward the second area R2 surrounded by the first area R1 when viewed in the light incident direction D1 than the amount of fluorescence LY that exits from the first area R1.

Figure 14:
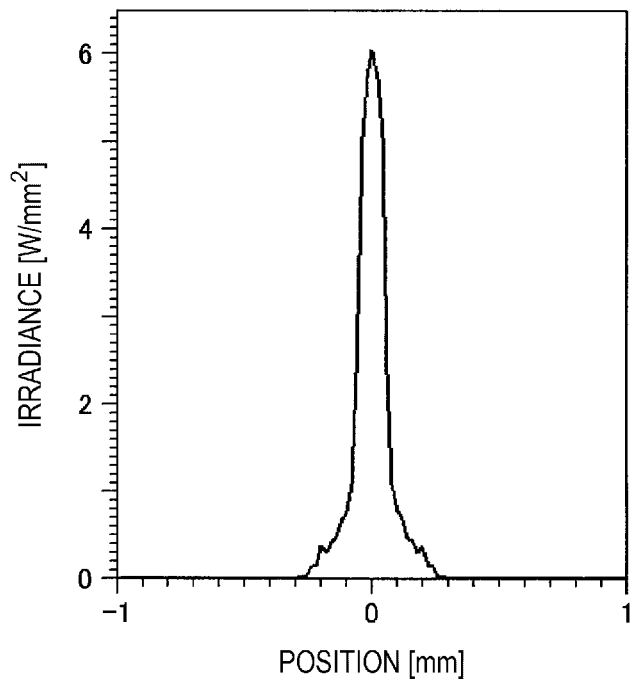
FIG. 14 shows a graph illustrating the result of numerical calculation of the irradiance distribution of fluorescence outputted from the wavelength converter shown in FIG. 13.

FIG. 14 shows a graph illustrating the result of numerical calculation of the irradiance distribution of the fluorescence LY outputted from the wavelength converter 40E based on a modeled structure of the wavelength converter 40E shown in FIG. 13.

In FIG. 14, the vertical axis represents the irradiance (unit: W/mm$^2$) of the fluorescence LY. In FIG. 14, the horizontal axis represents the position (unit: mm) relative to an origin or the center of the transparent phosphor 42 of the wavelength converter 40E when viewed in the light incident direction D1.

Comparison between FIGS. 14 and 6 shows that in the light source apparatus according to the present embodiment, since the wavelength converter 40E includes the angle changer 46 in the portion 42F corresponding to the second area R2, a larger amount of fluorescence LY is more smoothly allowed to exit from the second area R2 than the amount of fluorescence LY that exits from the first area R1, and the fluorescence LY can be narrower than the fluorescence LY that exits from the wavelength convert 140, which includes no angle changer 46, whereby an increase in etendue can be suppressed, as in the first embodiment and the other embodiments. Further, resulting from the fact that the angle changer 46 is provided, the foot of the irradiance distribution of the fluorescence LY outputted from the wavelength converter 40E toward the second area R2 varies by a smaller amount than the foot of the irradiance distribution of the fluorescence LY outputted from the wavelength converter 40A (see FIG. 4), and a single sharp peak is created in the first area R1.

In each of the embodiments described above, a portion 42G of the front surface 42a of the transparent phosphor 42 that is the portion corresponds to the first area R1 may be provided with a fluorescence reflector (not shown) that transmits the blue light LB traveling in the light incident direction D1 but blocks the fluorescence LY traveling in the light exiting direction D4. The fluorescence reflector is not limited to a specific component and may be any component that can transmit the blue light LB but block the fluorescence as described above. The fluorescence reflector may, for example, be a dichroic mirror. Providing the fluorescence reflector as described above allows reduction in the amount of fluorescence LY that exits from the first area R1, narrows the fluorescence LY, and suppresses an increase in etendue.

Preferable embodiments of the present disclosure have been described above in detail. The present disclosure is, however, not limited to a specific embodiment, and a variety of modifications and changes can be made to the embodiments within the scope of the substance of the present disclosure set forth in the appended claims.

For example, in each of the embodiments described above, the projectors 1A and 1B each including the three light modulators 4R, 4G, and 4B are presented by way of example, and a projector according to an embodiment of the present disclosure may be a projector that displays color video images via one light modulator. Further, a digital mirror device may be used as each of the light modulators.

What is claimed is:

1. A light source apparatus comprising:
an excitation light source that outputs excitation light; and
a wavelength converter including a transparent phosphor on which the excitation light is incident and which then emits fluorescence having a wavelength different from a wavelength of the excitation light, and
a base on which the transparent phosphor is provided,
wherein the wavelength converter has
a light incident area on which the excitation light is incident,
a first area that causes the fluorescence to exit to part of the light incident area,
a second area that differs from the first area, is surrounded by at least part of the first area when viewed in a first direction in which the excitation light is incident, and causes a larger amount of the fluorescence to exit to part of the light incident area than an amount of the fluorescence that exits from the first area, and
an angle changer that is provided in a portion corresponding to the second area and changes a direction in which the fluorescence travels.

2. The light source apparatus according to claim 1,
wherein the transparent phosphor is provided in a portion corresponding to the first area,
the angle changer includes
a first reflector that is provided on an outer circumferential side surface of the transparent phosphor in the portion corresponding to the first area and reflects the excitation light and the fluorescence, and
a second reflector that is provided on the base in the portion corresponding to the second area and has a reflection surface that reflects the excitation light incident on the reflection surface to the transparent phosphor and reflects the fluorescence emitted from the transparent phosphor in a direction parallel to the first direction and opposite to the first direction, and
the reflection surface so inclines as to separate away from an outer circumference of a surface of the base that is a surface on which the excitation light is incident and approach a center of the surface with distance from the surface in a thickness direction of the base.

3. The light source apparatus according to claim 2,
wherein irregularities are formed on an inner circumferential side surface of the transparent phosphor.

4. The light source apparatus according to claim 2,
wherein the transparent phosphor further fills a space between the first reflector and the second reflector in a direction along the surface of the base that is the surface on which the excitation light is incident.

5. The light source apparatus according to claim 1,
wherein the transparent phosphor is provided in a portion corresponding to the first area and a portion corresponding to part of the second area,
the angle changer includes
a first reflector that is provided on an outer circumferential side surface of the transparent phosphor in the portion corresponding to the first area and reflects the excitation light and the fluorescence, and
a first refractor that is provided on the base in the portion corresponding to the second area and has a first refraction surface that refracts the excitation light incident on the first refraction surface to the transparent phosphor and refracts the fluorescence emitted from the transparent phosphor in a direction parallel to the first direction and opposite to the first direction, and
the first refraction surface so inclines as to separate away from an outer circumference of a surface of the base that is a surface on which the excitation light is incident and approach a center of the surface with distance from the surface in a thickness direction of the base.

6. The light source apparatus according to claim 1,
wherein the transparent phosphor is provided in a portion corresponding to the first area and a portion corresponding to part of the second area,
the angle changer includes
- a first reflector that is provided on an outer circumferential side surface of the transparent phosphor in the portion corresponding to the first area and reflects the excitation light and the fluorescence, and
- a second refractor that is provided on the base in the portion corresponding to the second area and has a second refraction surface that refracts the excitation light incident on the second refraction surface to the transparent phosphor and refracts the fluorescence emitted from the transparent phosphor in a direction parallel to the first direction and opposite to the first direction, and the second refraction surface so inclines as to separate away from a center of a surface of the base that is a surface on which the excitation light is incident and approach an outer circumference of the surface with distance from the surface in a thickness direction of the base.

7. The light source apparatus according to claim 1, wherein a fluorescence reflector that transmits the excitation light and reflects the fluorescence is provided on a surface of the first area of the transparent phosphor that is a surface on which the excitation light is incident.

8. A projector comprising:
the light source apparatus according to claim 1;
a light modulator that modulates light outputted from the light source apparatus in accordance with image information to form image light; and
a projection system that projects the image light.

9. A projector comprising:
the light source apparatus according to claim 2;
a light modulator that modulates light outputted from the light source apparatus in accordance with image information to form image light; and
a projection system that projects the image light.

10. A projector comprising:
the light source apparatus according to claim 3;
a light modulator that modulates light outputted from the light source apparatus in accordance with image information to form image light; and
a projection system that projects the image light.

11. A projector comprising:
the light source apparatus according to claim 4;
a light modulator that modulates light outputted from the light source apparatus in accordance with image information to form image light; and
a projection system that projects the image light.

12. A projector comprising:
the light source apparatus according to claim 5;
a light modulator that modulates light outputted from the light source apparatus in accordance with image information to form image light; and
a projection system that projects the image light.

13. A projector comprising:
the light source apparatus according to claim 6;
a light modulator that modulates light outputted from the light source apparatus in accordance with image information to form image light; and
a projection system that projects the image light.

14. A projector comprising:
the light source apparatus according to claim 7;
a light modulator that modulates light outputted from the light source apparatus in accordance with image information to form image light; and
a projection system that projects the image light.

* * * * *